United States Patent
Batton

(10) Patent No.: US 6,203,065 B1
(45) Date of Patent: Mar. 20, 2001

(54) VEHICLE FLUID TANK

(75) Inventor: John L. Batton, Racine, WI (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/339,535

(22) Filed: Jun. 24, 1999

Related U.S. Application Data

(63) Continuation of application No. 08/926,044, filed on Sep. 9, 1997.

(51) Int. Cl.⁷ .................................................. B60P 3/22
(52) U.S. Cl. ............................................................. 280/830
(58) Field of Search ................................ 280/830, 833, 280/834; 220/562

(56) References Cited

U.S. PATENT DOCUMENTS

| | | | |
|---|---|---|---|
| 3,343,703 | 9/1967 | Snyder | 220/1 |
| 3,642,296 | 2/1972 | Froumajou | 280/5 A |
| 4,090,721 | 5/1978 | Wedin et al. | 280/5 A |
| 4,223,899 | 9/1980 | Krieger | 280/5 A |
| 4,506,756 | 3/1985 | Bergous | 180/291 |
| 5,458,373 | 10/1995 | Scheurenbrand et al. | 280/834 |
| 5,496,069 | 3/1996 | Milligan | 280/830 |
| 5,542,707 | 8/1996 | Kamei et al. | 280/834 |
| 5,794,979 | 8/1998 | Kasuga et al. | 280/834 |

*Primary Examiner*—Kevin Hurley
*Assistant Examiner*—Andrew J. Fischer
(74) *Attorney, Agent, or Firm*—Foley & Lardner

(57) ABSTRACT

A fluid tank for use with a vehicle having an axle and a rim supported by the axle. The tank includes a hollow body defining a reservoir for containing fluid. The reservoir at least partially extends about the axle. Preferably, the reservoir projects into a hollow area of the tire rim.

23 Claims, 7 Drawing Sheets

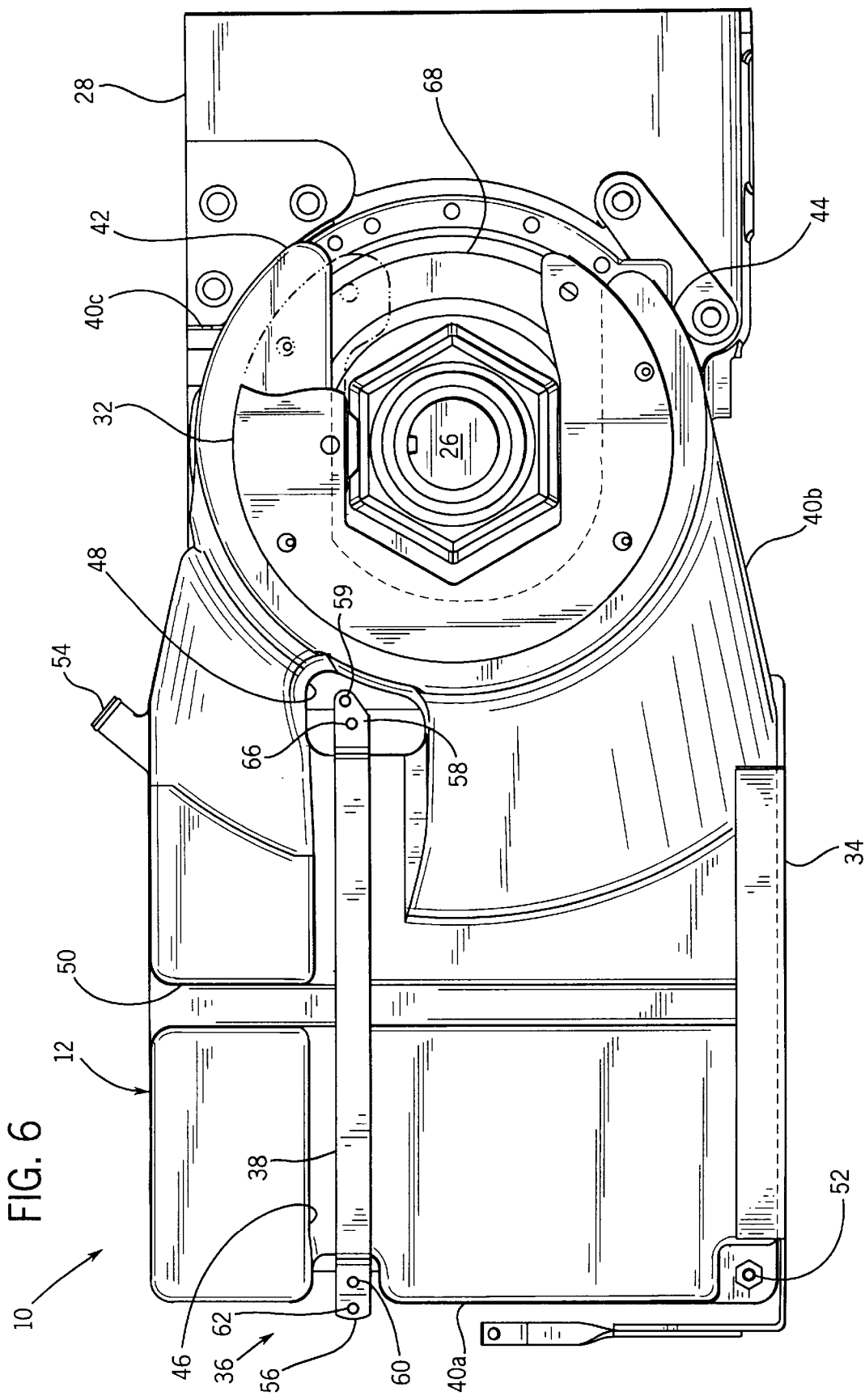

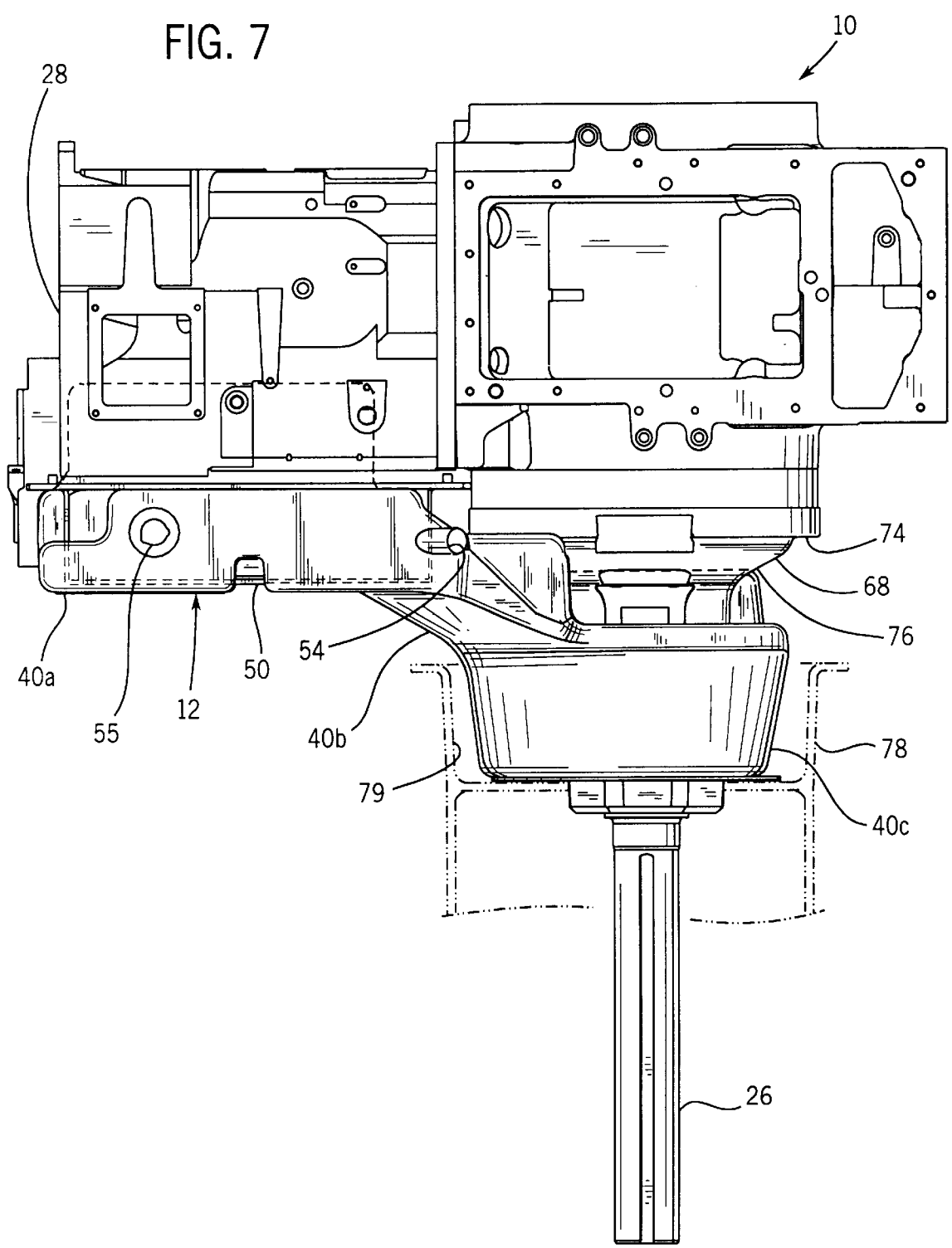

VEHICLE FLUID TANK

CROSS-REFERENCE TO RELATED APPLICATIONS

This application is a continuation of application Ser. No. 08/926,044, filed Sep. 9, 1997.

FIELD OF THE INVENTION

The present invention relates to tanks for containing fluids such as fuel. In particular, the present invention relates to a fluid tank for use with a vehicle having an axle.

BACKGROUND OF THE INVENTION

Fluid tanks are commonly employed in recreational, agricultural and construction vehicles for storing necessary fluids such as fuel, oil, radiator coolant, and windshield wiper fluid. These fluid tanks are typically preformed and securing mounted to the vehicle frame. In some applications, the fluid tank is integrally formed as part of the frame. Because the tank stores essential fluid which is consumed during operation of the vehicle, it is advantageous to maximize the volume of the tank to prolong the time between necessary refills. Alternatively, the vehicle may be provided with an auxiliary tank to prolong the time between fill-ups. However, increasing the volume of the tank or providing an additional auxiliary tank both require additional space. In many vehicles, this additional space is simply not available.

One example of where there is a great need to increase tank capacity is with the fuel tanks of agricultural vehicles such as tractors. Tractors are frequently used to pull and power a wide variety of relatively large agricultural implements across large acreages or fields. These fields are frequently remote from fueling stations. As a result, refueling the tractor is extremely time consuming and inconvenient.

To prolong the periods between required refueling, many tractors are provided with enlarged tanks and additional auxiliary tanks. However, these larger tanks and additional auxiliary tanks occupy much needed space. Moreover, because these larger tanks and additional auxiliary tanks must be located and sized so as to not interfere with the normal functioning of the tractor, the additional fuel storage capacity provided by the tanks is limited. Thus, there remains a great need for increasing the fuel storage capacity while utilizing the vehicle's available space.

SUMMARY OF THE INVENTION

The present invention is directed to a fluid tank for use with a vehicle having an axle. The tank includes a hollow body defining a reservoir for containing fluid. The reservoir at least partially extends around the axle.

The present invention is also directed to a fluid tank for use with a vehicle having a side, an axle projecting from the side and a hollow rim supported by the axle for supporting a ground engaging member. The tank includes a hollow body which defines a fluid reservoir. The fluid reservoir at least partially projects into the hollow rim.

The present invention is more specifically directed to the aforementioned fluid tank wherein the tank has a face configured for mating with the side of the vehicle. The hollow body of the tank preferably includes a C-shaped portion and preferably extends forward of the axle toward the front of the vehicle. The C-shaped portion is preferably configured so as to prevent fluids from being trapped about the axle.

BRIEF DESCRIPTION OF THE DRAWINGS

FIG. 6 is a side elevational view of the tank supporting system mounting the fluid tank adjacent the transmission housing.

FIG. 7 is a top view of the fluid tank positioned adjacent a tire rim of the tractor.

DETAILED DESCRIPTION OF THE PREFERRED EMBODIMENT

Figure 1:
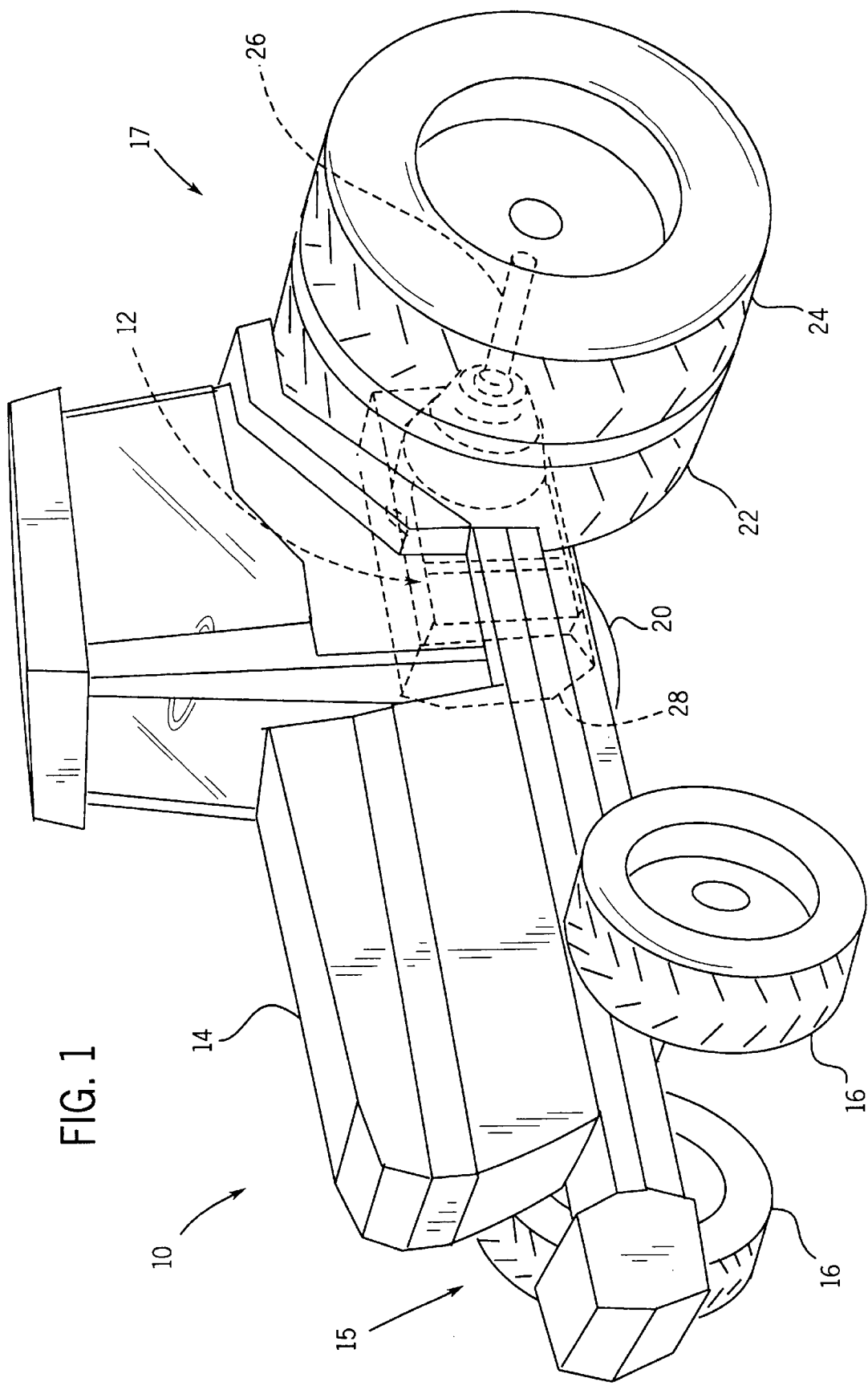
FIG. 1 is a perspective view of a tractor including a fluid tank (shown in phantom) according to the present invention.

FIG. 1 illustrates a tractor 10 including a fluid tank 12 (schematically shown in phantom). Tractor 10 generally includes a main tractor-body portion 14, front tires 16 and 18, rear tires 20, 22, and 24, and an axle 26 (shown in phantom). Main tractor-body portion 14 houses the engine, controls, and transmission housing 28 of tractor 10. Transmission housing 28 (schematically shown in phantom) houses the drive and transmission of tractor 10 which rotatably drive axle 26 and rear wheels 20, 22, and 24.

Front tires 16 and 18 are rotatably mounted to a front end 15 of main tractor-body portion 14. Rear tires 20, 22, and 24 are rotatably mounted to axle 26 to support a rear end 17 of main tractor-body portion 14.

Fluid tank 12 (shown in phantom) is a hollow body having an interior for containing fluid. Fluid tank 12 extends around and forward of axle 26 toward the front end 15 of tractor 10. Fluid tank 12 also preferably extends from transmission housing 28 into rim 78 (shown in FIG. 7) of tire 22. Because fluid tank 12 extends at least partially around axle 26 and into the rim 78 of tire 22, fluid tank 12 provides additional volume for fluid while utilizing existing space in tractor 10.

As can be appreciated, fluid tank 12 can be enlarged or reduced, depending on the type of engine with which it is used. As can be further appreciated fluid tank 12 may also be embodied in a track-driven tractor or in a variety of different types of vehicles.

Figure 2:
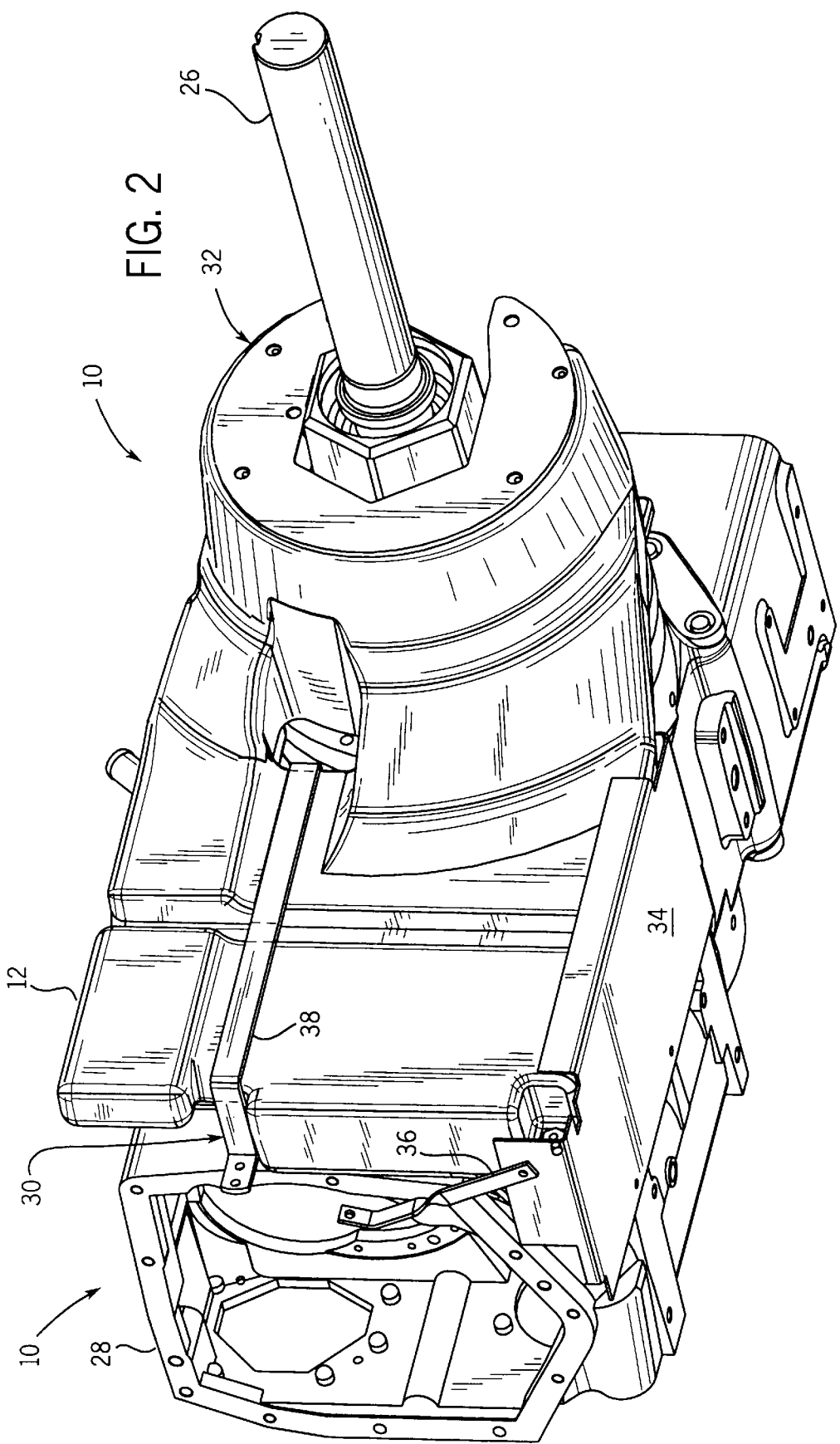
FIG. 2 is a perspective view of a shield and a tank supporting system mounting the fluid tank adjacent a transmission housing and an axle of the tractor.

FIG. 2 is a perspective view illustrating fluid tank 12 and transmission housing 28 in greater detail. As shown by FIG. 2, tractor 10 includes a tank supporting system 30 and a shield 32 mounting fluid tank 12 adjacent to transmission housing 28 and axle 26 of tractor 10. Tank supporting system 30 generally includes support members 34, 36, 38 and 39 (shown in FIG. 5). Support members 34, 36, 38 and 39 generally extend beneath and across fluid tank 12 to securely mount fluid tank 12 adjacent to transmission housing 28 and about axle 26.

Shield 32 preferably comprises a generally flat plate configured to cover and protect at least a portion of fluid tank 12 from rim 78 of tire 22 (shown in FIG. 7). In the preferred embodiment illustrated, shield 32 protects a portion of fluid tank 12 about axle 26. Alternatively, shield 32 may have a variety of other shapes and configurations depending upon the configuration of tank 12 and rim 78.

Figure 3:
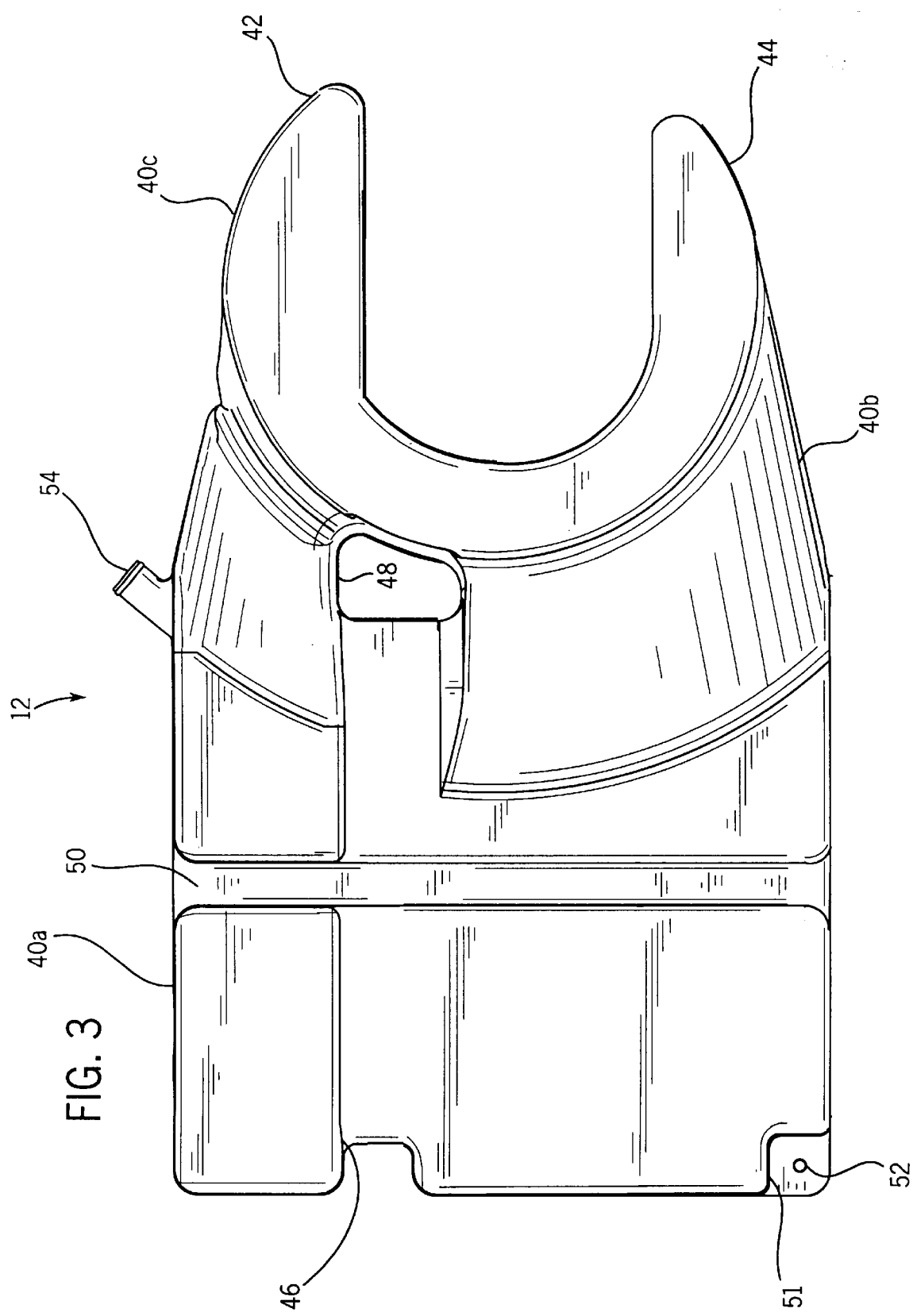
FIG. 3 is a side elevational view of the fluid tank of FIG. 2.
Figure 4:
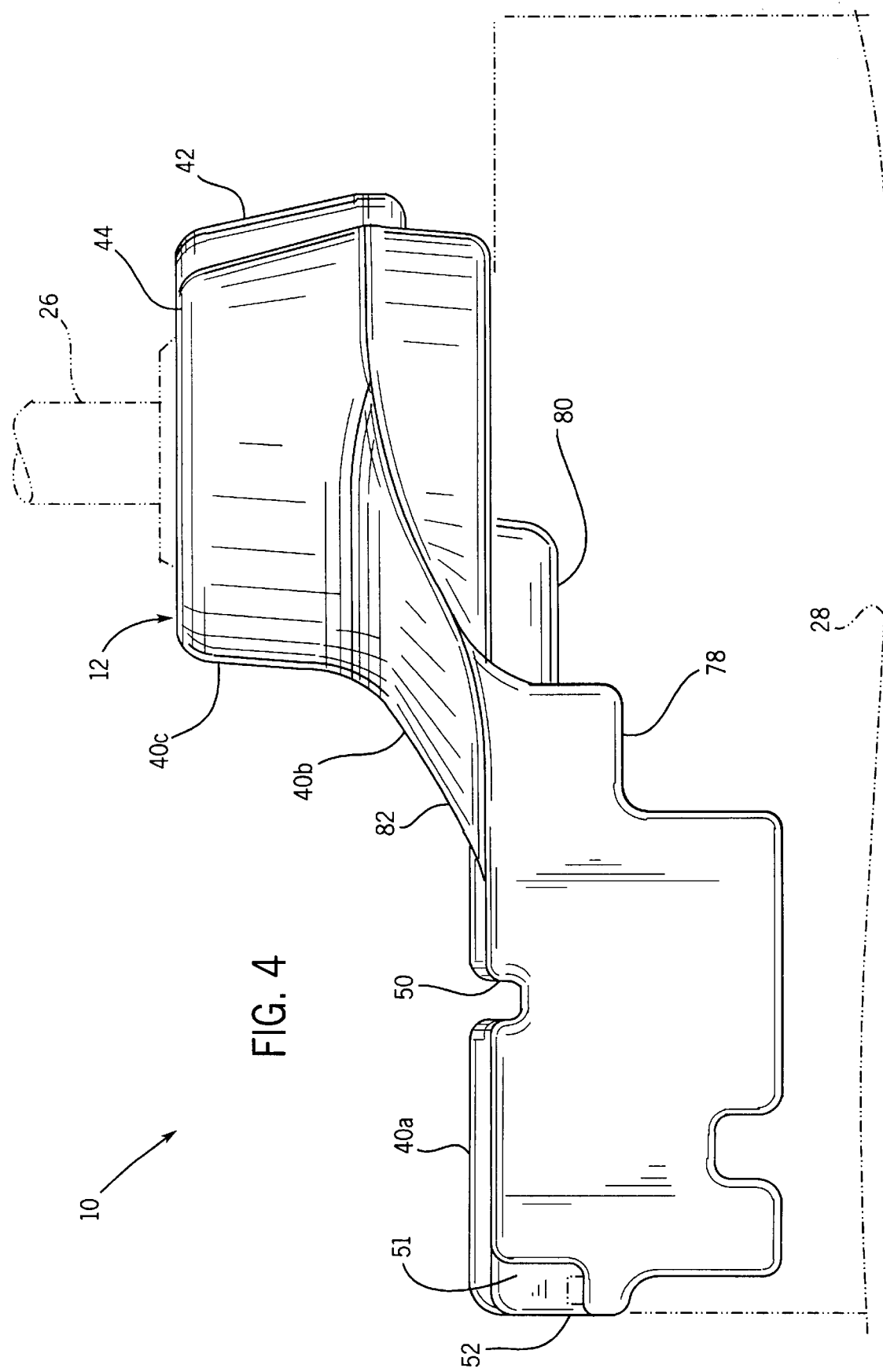
FIG. 4 is a bottom elevational view of the fluid tank supported adjacent the transmission housing and axle of FIG. 2.

FIGS. 3 and 4 illustrate fluid tank 12 in greater detail. FIG. 3 is a side elevational view of fluid tank 12. FIG. 4 is a bottom plan view of fluid tank 12 mounted to transmission housing 28. As shown by FIG. 3, tank 12 includes a forward portion 40a, a projection portion 40b, an axle portion 40c, a horizontal channel 46, an opening 48, a vertical groove 50, a drain port 52, a fill port 54 and an outlet port 55 (shown in FIG. 7). As shown by FIG. 4, forward portion 40a is hollow and is configured so as to mate with a side of transmission housing 28.

Figure 5:
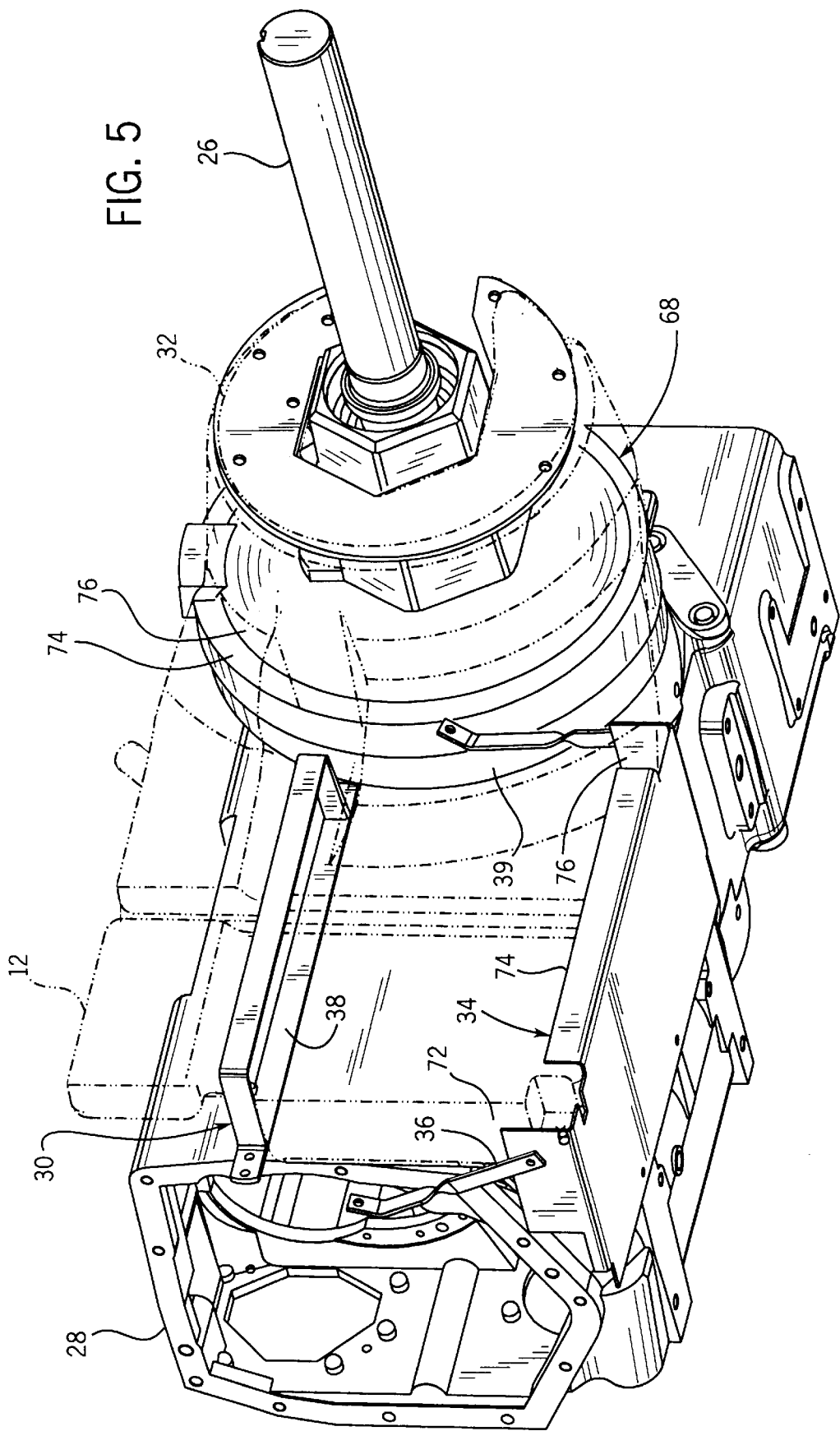
FIG. 5 is a bottom perspective view of the shield and the tank supporting system mounting the fluid tank (shown in phantom) to the transmission housing.

Projection portion 40b is hollow and extends from forward portion 40a to axle portion 40c. Projection portion 40b is specifically configured for mating with axle housing 68 (shown in FIGS. 5 and 7) and for projecting away from housing 28 into rim 78 (shown in FIG. 7). As shown by FIG. 5, axle housing 68 encloses bearings and other associated components of axle 26 and forms circular shoulders 74, 76 extending about axle 26. Accordingly, projection portion 40b includes corresponding shouldered surfaces 78, 80 and ramp surface 82. Should surfaces 78, 80 mate with shoulders 74, 76 of axle housing 68 while ramp surface 82 projects into rim 78 (shown in FIG. 7).

Axle portion 40c, having ends 42 and 44, is hollow, and extends about axle 26 to provide additional volume for fluid tank 12. Axle portion 40c of fluid tank 12 preferably forms approximately a 280° C-shaped arc around axle 26. Because axle portion 40c is preferably C-shaped, fluid tank 12 may be easily positioned about axle 26 by moving axle 26 between ends 42 and 44 of axle portion 40c. Ends 42 and 44 are preferably shaped to allow fluid to flow toward the bottom of fluid tank 12 by gravity as the tank is emptied, making it impossible for fluid to be trapped in any part of fluid tank 12 around axle 26.

Horizontal channel 46 is a rectangular recess in forward portion 40a and projection portion 40b, in which support member 38 fits to secure fluid tank 12 to transmission housing 28. Generally, support member 38 will mount to the vehicle through opening 48, located between axle portion 40c and forward portion 40a of the tank at one end of horizontal channel 46. Vertical groove 50 is a rectangular recess which extends from the top to the bottom of fluid tank 12 which provides fluid tank 12 with structural support.

Drain port 52 is a circular aperture located in recess 51 at the lower left corner of forward portion 40a. Drain port 52 allows the tank to be drained of its fluid contents. Fill port 54 is located at the top of fluid tank 12 and provides an input port for fluid. Outlet port 55 extends through the walls of tank 12 to provide communication with the interior of tank 12 for withdrawing fluid from tank 12. In the preferred embodiment illustrated, fill port 54 is fluidly connected to a main fluid tank (not shown). Alternatively, fill port 54 may be configured and located for direct manual filling of fluid tank 12 by an operator. As can be appreciated, the specific shape of fluid tank 12 can be changed to allow for different mounting and coupling configurations.

FIGS. 5 and 6 illustrate support members 34, 36, 38 and 39 of tank supporting system 30 in greater detail. FIG. 5 is a bottom perspective view of tank supporting system 30 secured to transmission housing 38 with fluid tank 12 shown in phantom. FIG. 6 is a side elevational view of tank supporting system 30 mounting fluid tank 12 to transmission housing 28. As best shown by FIG. 5, support member 34, located underneath fluid tank 12 and partially under transmission housing 28, is generally pan-shaped with sides 72, 74, and 76 and is designed such that fluid tank 12 (shown in phantom) rests on it.

Support members 36 and 39 are rigid metal straps that couple member 34 to transmission housing 28. Support member 38 is generally a "U"-shaped member which couples and supports fluid tank 12 to transmission housing 28. Support member 38 fits inside horizontal channel 46 adjacent fluid tank 12 and extends across forward portion 40a and through opening 48. Ends 56 and 58 of support member 38 are fastened to transmission housing 28 through holes 60, 62, 64, and 66 using conventionally known fasteners. Tank supporting system 30 may be alternatively configured to couple different-shaped fluid tanks to transmission housing 28 and axle 26. Although fluid tank 12 is shown mounted to transmission housing 28 on tractor 10, fluid tank 12 may be mounted to a frame or other structure on any of a variety of vehicles by a variety of different means. Alternatively, fluid tank 12 and members 34, 36, 38 and 39 of supporting system 30 may be formed as an integral and inseparable part of the transmission housing 28 and axle 26.

FIG. 7 is a top view of fluid tank 12 adjacent tire rim 78 of tractor 10. FIG. 7 illustrates fluid tank 12 coupled and supported adjacent to transmission housing 28, around axle 26 and between transmission housing 28, axle housing 68 and tire rim 78. As conventionally known, tire rim 78 is a cylindrical-shaped rigid support member mounted to axle 26 for supporting a tire (not shown). Tire rim 78 defines a hollow interior 79 encircling axle 26 adjacent to transmission housing 28 and axle housing 68. Projection portion 40b of tank 12 extends from a side of transmission housing 28 and axle housing 68 into hollow interior 79 of tire rim 78. Projection portion 40b and axle portion 40c are designed to maximize potential volume of fluid tank 12 by occupying space adjacent axle 26 and between axle housing and tire rim 78.

In conclusion, vehicle fluid tank 12 provides additional space for fuel, oil, radiator coolant, or other fluids used in recreational, agricultural and construction vehicles. Because fluid tank 12 extends around axle 26 and into the space between axle 26 and tire rim 78, fluid tank 12 utilizes existing space to increase fuel capacity while not interfering with the normal functioning of the vehicle.

In addition, fluid tank 12 can be easily mounted and adapted for use on existing vehicles. Since the tank supporting system attaches fluid tank 12 to transmission housing 28 without requiring disassembly of the entire tractor, fluid tank 12 provides an inexpensive option for vehicle owners wanting tractors that can operate longer in the fields without needing to refuel.

As can be appreciated, fluid tank 12, tank supporting system 30 and shield 32 may have a variety of sizes and shapes, and may be made from a variety of materials. Moreover, fluid tank 12 may be provided with a variety of differently sized and located inlet and outlet ports for filling tank 12 with fluid or for removing fluid from tank 12. Fluid tank 12 may be used as a main fluid tank or as a supplemental or auxiliary fuel tank.

Although the present invention has been described with reference to the preferred embodiment, those skilled in the art will recognize that changes may be made in form and detail without departing from the spirit and scope of the invention.

What is claimed is:

1. In a vehicle having a front, a rear, a longitudinal centerline extending from the front to the rear, a side extending between the front and the rear and an axle projecting from the side, an improvement comprising:

a fuel reservoir extending at least 180 degrees about the axle.

2. The improved vehicle of claim 1, wherein the vehicle includes a tire rim having an interior and wherein the reservoir projects into the interior of the rim.

3. The improved vehicle of claim 1, wherein the vehicle includes a tire rim and wherein the reservoir is sandwiched between the side of the vehicle and the rim.

4. The improved vehicle of claim 1 including:
a fuel tank coupled to the vehicle, wherein the fuel tank defines the fuel reservoir.

5. The improved vehicle of claim 4 including:
a pan coupled to the side of the vehicle and extending below the tank, wherein the pan supports the tank.

6. The improved vehicle of claim 4 including:
a support member coupled to the side of the vehicle and extending adjacent the tank opposite the side of the vehicle to retain the tank against the side of the vehicle.

7. The improved vehicle of claim 4 wherein the vehicle includes a tire rim and wherein the improvement further includes:
a shield between the tank and the rim.

8. The improved vehicle of claim 4, wherein the tank has a face configured for mating with the side of the vehicle.

9. A work vehicle, comprising:
a body portion;
an axle mounted to the body portion;
a rim coupled to the axle, the rim having an interior;
wheels coupled to the rim; and
a fluid tank extending into the interior of the rim.

10. The work vehicle of claim 9, wherein the fluid tank includes a C-shaped portion having an opening receiving the axle.

11. The work vehicle of claim 9, wherein the fluid tank extends forward of the axle towards a front of the work vehicle.

12. The work vehicle of claim 9, wherein the fluid tank is configured for substantially abutting against a side of the work vehicle.

13. A tractor comprising:
a chassis;
a cab supported by the chassis;
an engine mounted to the chassis;
an axle mounted to the chassis;
ground engaging members mounted to the axle;
a transmission housing mounted to the chassis of the tractor; and
a fluid tank extending at least partially about the axle and located between the transmission housing and one of the ground engaging members.

14. The tractor of claim 13, wherein the fluid tank is a tank defining a reservoir for containing combustible fuel, the combustible fuel being used by the tractor.

15. The tractor of claim 1, wherein the ground engaging members are selected from a group including: tires and tracks.

16. A tractor comprising:
a chassis;
a cab supported by the chassis;
a an engine mounted to the chassis:
an axle mounted to the chassis;
ground engaging members operably coupled to the axle; and
a fluid tank extending above the axle between the chassis and the ground engaging members, wherein the fluid tank includes a C-shaped portion having an opening receiving the axle.

17. The tractor of claim 16, wherein the ground engaging members are selected from a group including: tires and tracks.

18. The tractor of claim 16, further comprising a transmission housing mounted on the chassis of the tractor, wherein the fluid tank is located between the transmission housing and one of the ground engaging members.

19. The tractor of claim 16, wherein the fluid tank is a tank defining a reservoir for containing combustible fuel, the combustible fuel being used by the tractor.

20. The work vehicle of claim 1, further comprising ground engaging members operably coupled to the axle.

21. The work vehicle of claim 20, wherein the ground engaging members are selected from the group including tires and tracks.

22. The work vehicle of claim 1, wherein the fluid reservoir includes a C-shaped portion having an opening receiving the axle.

23. The work vehicle of claim 13, wherein the fluid tank includes a C-shaped portion having an opening receiving the axle.

* * * * *